(12) United States Patent
Hernacki

(10) Patent No.: US 8,495,660 B1
(45) Date of Patent: Jul. 23, 2013

(54) METHODS AND SYSTEMS FOR HANDLING INSTANT MESSAGES AND NOTIFICATIONS BASED ON THE STATE OF A COMPUTING DEVICE

(75) Inventor: Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1220 days.

(21) Appl. No.: 12/057,690

(22) Filed: Mar. 28, 2008

(51) Int. Cl.
*G06F 9/46* (2006.01)

(52) U.S. Cl.
USPC ............ 719/318; 719/313; 719/314; 719/320

(58) Field of Classification Search
None
See application file for complete search history.

(56) References Cited

U.S. PATENT DOCUMENTS

| | | | | |
|---|---|---|---|---|
| 5,617,526 A * | 4/1997 | Oran et al. | | 715/779 |
| 6,360,252 B1 * | 3/2002 | Rudy et al. | | 709/206 |
| 6,510,424 B1 * | 1/2003 | Ford et al. | | 1/1 |
| 6,601,012 B1 * | 7/2003 | Horvitz et al. | | 702/150 |
| 6,618,716 B1 * | 9/2003 | Horvitz | | 706/55 |
| 7,209,916 B1 * | 4/2007 | Seshadri et al. | | 707/1 |
| 7,730,030 B1 * | 6/2010 | Xu | | 707/617 |
| 2001/0035881 A1 * | 11/2001 | Stoakley et al. | | 345/772 |
| 2002/0035605 A1 * | 3/2002 | McDowell et al. | | 709/206 |
| 2002/0073207 A1 * | 6/2002 | Widger et al. | | 709/227 |
| 2002/0083134 A1 * | 6/2002 | Bauer et al. | | 709/204 |
| 2002/0085037 A1 * | 7/2002 | Leavitt et al. | | 345/765 |
| 2002/0118809 A1 * | 8/2002 | Eisenberg | | 379/202.01 |
| 2002/0126135 A1 * | 9/2002 | Ball et al. | | 345/600 |
| 2002/0129092 A1 * | 9/2002 | Tolson et al. | | 709/202 |
| 2002/0174010 A1 * | 11/2002 | Rice, III | | 705/14 |
| 2003/0035412 A1 * | 2/2003 | Wang et al. | | 370/352 |
| 2003/0119532 A1 * | 6/2003 | Hatch | | 455/466 |
| 2003/0120805 A1 * | 6/2003 | Couts et al. | | 709/238 |
| 2003/0193967 A1 * | 10/2003 | Fenton et al. | | 370/490 |
| 2004/0024822 A1 * | 2/2004 | Werndorfer et al. | | 709/206 |
| 2004/0061716 A1 * | 4/2004 | Cheung et al. | | 345/710 |
| 2004/0068481 A1 * | 4/2004 | Seshadri et al. | | 707/1 |
| 2004/0081951 A1 * | 4/2004 | Vigue et al. | | 434/350 |
| 2004/0142709 A1 * | 7/2004 | Coskun et al. | | 455/466 |
| 2004/0181550 A1 * | 9/2004 | Warsta et al. | | 707/104.1 |
| 2004/0183749 A1 * | 9/2004 | Vertegaal | | 345/7 |
| 2004/0194116 A1 * | 9/2004 | McKee et al. | | 719/318 |
| 2004/0205034 A1 * | 10/2004 | Bigus et al. | | 706/10 |
| 2004/0254998 A1 * | 12/2004 | Horvitz | | 709/206 |
| 2005/0071506 A1 * | 3/2005 | Hettish | | 709/245 |
| 2005/0080848 A1 * | 4/2005 | Shah | | 709/204 |
| 2005/0204009 A1 * | 9/2005 | Hazarika et al. | | 709/206 |
| 2005/0221841 A1 * | 10/2005 | Piccionelli et al. | | 455/456.3 |
| 2005/0278620 A1 * | 12/2005 | Baldwin et al. | | 715/513 |

(Continued)

OTHER PUBLICATIONS

"Review Guide—Gmail Chat," Google, http://google.com, Feb. 2006.

*Primary Examiner* — Andy Ho
*Assistant Examiner* — Shih-Wei Kraft
(74) *Attorney, Agent, or Firm* — ALG Intellectual Property, LLC

(57) ABSTRACT

A computer-implemented method for handling instant messages based on state may include identifying an instant message, detecting a first state of a computing device, and handling the instant message based on the first state of the computing device. The method may further include receiving a first instant-message-handling rule, receiving a first definition of the first state, and associating the first instant-message-handling rule with the first state. A computer-implemented method for preventing the output of instantaneous notifications may include identifying an instant notification, detecting a first state of a computing device, and preventing the instantaneous notification from being sent to an output device of the computing device. Corresponding computer-readable media are also disclosed.

20 Claims, 9 Drawing Sheets

U.S. PATENT DOCUMENTS

| | | | |
|---|---|---|---|
| 2006/0007051 A1* | 1/2006 | Bear et al. | 345/1.1 |
| 2006/0085581 A1* | 4/2006 | Martin | 710/260 |
| 2006/0168007 A1* | 7/2006 | Peters | 709/206 |
| 2006/0195379 A1* | 8/2006 | Abecassis et al. | 705/35 |
| 2006/0209867 A1* | 9/2006 | Schmidt et al. | 370/428 |
| 2006/0210027 A1* | 9/2006 | Kafri | 379/88.13 |
| 2006/0218635 A1* | 9/2006 | Kramer et al. | 726/22 |
| 2006/0271520 A1* | 11/2006 | Ragan | 707/3 |
| 2007/0032225 A1* | 2/2007 | Konicek et al. | 455/417 |
| 2007/0047522 A1* | 3/2007 | Jefferson et al. | 370/352 |
| 2007/0049335 A1* | 3/2007 | Haitani et al. | 455/556.2 |
| 2007/0094341 A1* | 4/2007 | Bostick et al. | 709/207 |
| 2007/0094360 A1* | 4/2007 | Forlenza et al. | 709/220 |
| 2007/0143433 A1* | 6/2007 | Daigle | 709/207 |
| 2007/0214429 A1* | 9/2007 | Lyudovyk et al. | 715/772 |
| 2008/0040433 A1* | 2/2008 | Glasgow | 709/206 |
| 2008/0043969 A1* | 2/2008 | Shi | 379/211.02 |
| 2008/0177726 A1* | 7/2008 | Forbes et al. | 707/5 |
| 2009/0144626 A1* | 6/2009 | Appelman et al. | 715/727 |

* cited by examiner

Database
300

METHODS AND SYSTEMS FOR HANDLING INSTANT MESSAGES AND NOTIFICATIONS BASED ON THE STATE OF A COMPUTING DEVICE

BACKGROUND

Instant messaging services have significantly impacted the way in which people may communicate with each other. Instant messaging services may include services such as AIM, GOOGLE TALK, and WINDOWS LIVE MESSENGER. Such services may provide users with advantages over traditional telecommunication and email services. For example, instant messaging services may allow a user to manage several chat sessions with multiple people at one time. Various instant messaging services may provide users with the ability to manage multiple communications and chat sessions.

Some instant messaging services may show status indicators that provide users with status information about their contacts. Such status indicators may also provide information about a user's own status. Instant messaging services may provide status indicators such as "online", "away", or "off" to indicate which contacts may be available for communication. Users may also make themselves appear offline to contacts with whom they do not wish to communicate. Some services may provide users with the option of renaming their status indicators. For example, a user may rename their "away" status indicator to "at lunch" or "in a meeting."

Status settings and indicators may not, however, provide users with the ability to effectively manage instant message communications. For example, if a user's status indicator shows "idle" during a meeting, an inappropriate message may still appear. Other types of instantaneous notifications may also appear at inconvenient times. For example, while giving a presentation, an anti-virus software message may appear to prompt a user to update their anti-virus software. Traditional messaging services may not provide users with the ability to manage messages and/or notifications that arrive at inopportune times.

SUMMARY

Embodiments of the instant disclosure may address various disadvantages and problems with traditional instant message and notification services and may also provide various other advantages and features. In some embodiments, an instant messaging client may be able to handle instant messages based on the state of a computing device. For example, instantaneous notifications may be prevented from being sent to an output device.

The instant disclosure covers various computer-implemented methods for handling instant messages. For example, a computer-implemented method may comprise identifying an instant message, detecting a first state of a computing device, and handling the instant message based on the first state of the computing device. Handling the instant message may comprise, but is not limited to, allowing the instant message to display, holding the message, sending an automatic reply to the sender of the message, ignoring the message, forwarding the message to another device, displaying a new message indicator with no audio notification, or displaying a new message indicator without displaying message content.

Defining the state of a computing device may provide useful context for handling instant messages. For example, the computer-implemented method may further comprise receiving a first definition of a first state, receiving a first instant-message-handling rule, and associating the first instant-message-handling rule with the first state. Handling the instant message based on the state of the computing device may comprise applying the first instant-message-handling rule to the instant message. In some embodiments, a user may manage instant message rules and states with a graphical user interface. The graphical user interface may receive the first definition of the first state and the first instant-message-handling rule from the user.

Various embodiments of the present disclosure may involve detecting a first state of the computing device. Detecting the first state of the computing device may comprise detecting that the computing device satisfies a first condition. The first condition may include a first location of the computing device, an application running on the computing device, a first condition of the first application, or a scheduled event. In some embodiments, scheduling information within a calendar program may be used to detect the state of a computing device. Also, the application running on the computing device may be a presentation application or a screen-sharing application.

Embodiments of the instant disclosure may provide various methods for detecting the state of a computing device. For example, a plug-in for an instant messaging client may periodically determine the state of the computing device, check the state of the computing device upon arrival of the instant message, or identify scheduling information from a calendar program. In other embodiments, detecting the state of the computing device, identifying an instant message, and handling the instant message may be performed by a stand-alone software application installed on the computing device.

In addition to handling instant messages, embodiments of the instant disclosure may also handle instantaneous notifications. For example, a message-handling module may prevent instantaneous notifications from being sent to an output device. Preventing an instantaneous notification from being sent to an output device may comprise storing the notification for future retrieval. The instantaneous notification may comprise a software-update notification, an email notification, a network-connectivity notification, a task-bar pop-up notification, an audio notification, or any other suitable notification. The output device may comprise an audio device or a display device.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
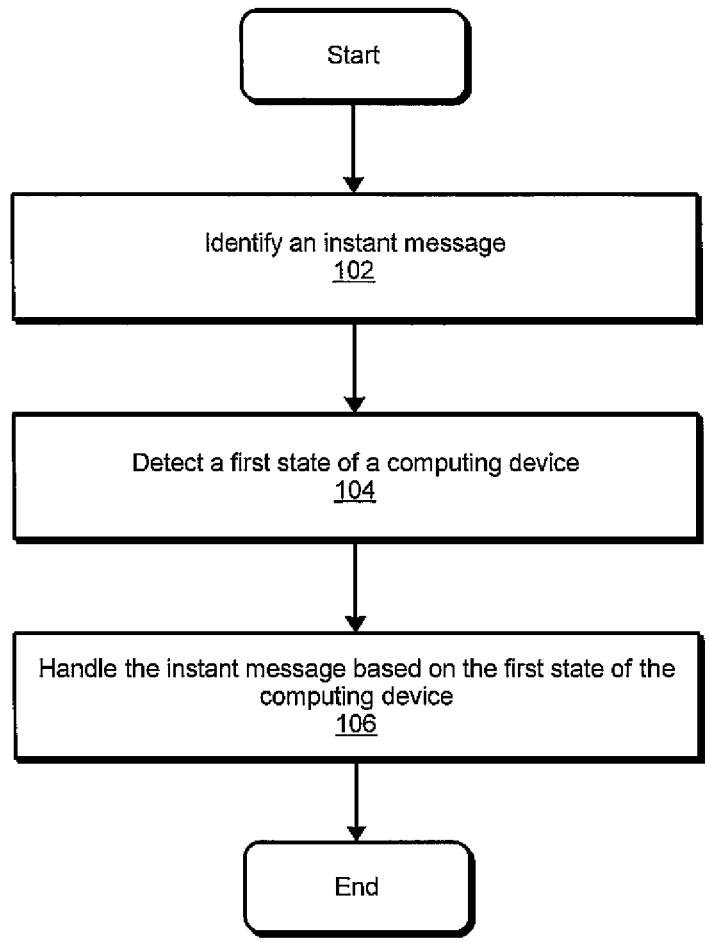
FIG. 1 is a flow diagram of an exemplary computer-implemented method for handling instant messages according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The following is intended to provide a detailed description of various exemplary embodiments and should not be taken to be limiting in any way. Various exemplary methods and systems for handling instant messages based on the state of a computing device are described and/or illustrated herein. The instant disclosure also presents embodiments for preventing instantaneous notifications from being sent to an output device. Embodiments of the disclosure apply to various computer and network devices and systems.

Instant messaging may generally refer to a process of communication for instantaneously transferring messages from one person to another. Typically, instant messaging clients are configured to show multiple messages between two people, or in other words, display a chat session between two people. Similarly, instantaneous notifications may include notifications about messages sent from one person to another. Instantaneous notifications may also provide a user with information about applications or processes running on a computing device. Instant messages and instantaneous notifications often arrive without warning and may be annoying or embarrassing to a user in some situations.

FIG. 1 is a block diagram of an exemplary method 100 for handling instant messages based on the state of a computing device. In certain exemplary embodiments, an instant message refers to an instantaneous communication received or sent by an instant messaging client. Examples of instant messaging clients may include GOGGLE TALK, AIM, WINDOWS LIVE MESSENGER, or any other suitable instant messaging clients. As used herein, the term computing device may refer to desktop computers, laptop computers, mobile computing devices, and various other types of computing devices.

A message-handling module may identify an instant message (step 102). The message-handling module may be part of an instant messaging client, a plug-in for an instant messaging client, a standalone application, or any other computer-executable code capable of identifying an instant message, handling an instant message, or performing any other suitable action with an instant message or in response to an instant message. In some embodiments, identifying an instant message refers generally to receiving or recognizing an instant message.

In traditional instant messaging clients, the client may immediately display the entire content of an instant message at the time it arrives. As discussed previously, displaying all or part of an instant message may be undesirable in certain situations. Embodiments of the instant disclosure may address this problem by handling instant messages based on the state of a computing device.

The message-handling module may detect a first state of a computing device (step 104). In certain embodiments, a computing device may be in a first state when the computing device satisfies a first predefined condition. For example, a first condition of the computing device may be that a web-meeting program is running on the computing device. Thus, the computing device may be in the first state when the web-meeting program is running.

According to various embodiments, a condition of the computing device may be a location of the computing device. The location of the computing device may be determined by a global positioning system (GPS), determining which network the computing device is connected to, or any other method of detecting the location of a computing device. For example, a computing device connected to a work network may be considered to be in a different state than when connected to a home network. As another example, the computing device may be in the first state when the computing device is connected to a wireless hotspot in a coffee shop. Alternatively, the computing device may be in the first state when a GPS module of the computing device detects that the computing device is within a set of predefined coordinates.

A condition of the computing device may also refer to whether an application is running on the computing device. For example, the computing device may be in the first state when a web meeting or presentation application is running on the computing device. In other embodiments, a condition of the computing device may refer to a mode of an application running on the computing device. For example, the computing device may be in the first state when a presentation application is in a slide-show mode or when the web-meeting program is in a screen-sharing mode. State conditions for a computing device may also be based on various other types of applications and application modes.

A condition of a computing device may also be based on an event scheduled in a scheduling program on the computing device. For example, detecting that the computing device is in the first state may comprise identifying scheduling information from a calendar program and determining that a scheduled event is occurring or is about to occur. A calendar program may contain information about work schedules, presentation times, meeting times, important dates, events, or any other schedule information. A calendar program may be a local or remote calendar agent. In some embodiments, the message-handling module may only look at a particular category of scheduled events (e.g., work events) in determining the state of the computing device.

Figure 3:
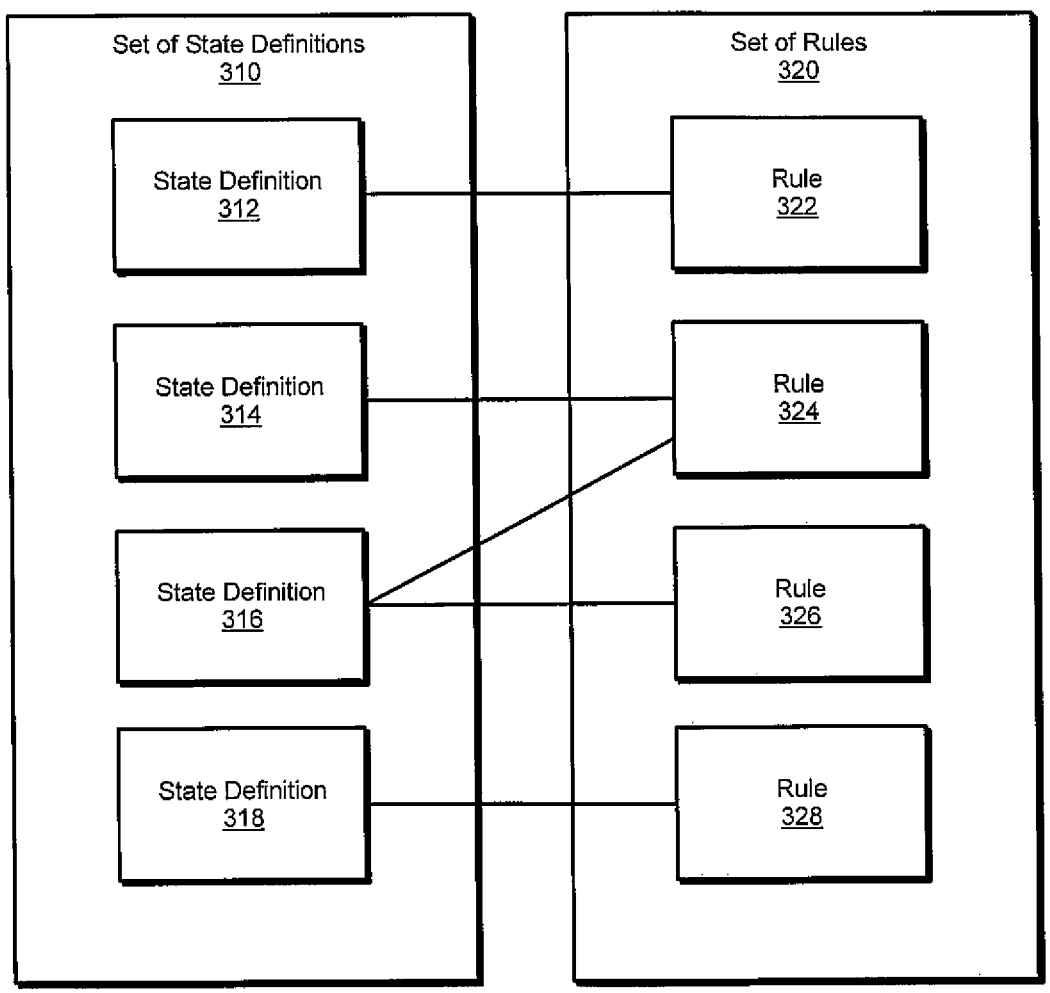
FIG. 3 is a block diagram of a database for storing state definitions and rules according to certain embodiments.

After detecting the first state of the computing device, the message-handling module may handle the instant message based on the first state of the computing device (step 106). For example, the message-handling module may prevent the message from displaying while the computing device is in the first state. The description corresponding to FIG. 3 presents various other examples of how a message-handling module may handle an instant message based on the state of a computing device.

Figure 2:
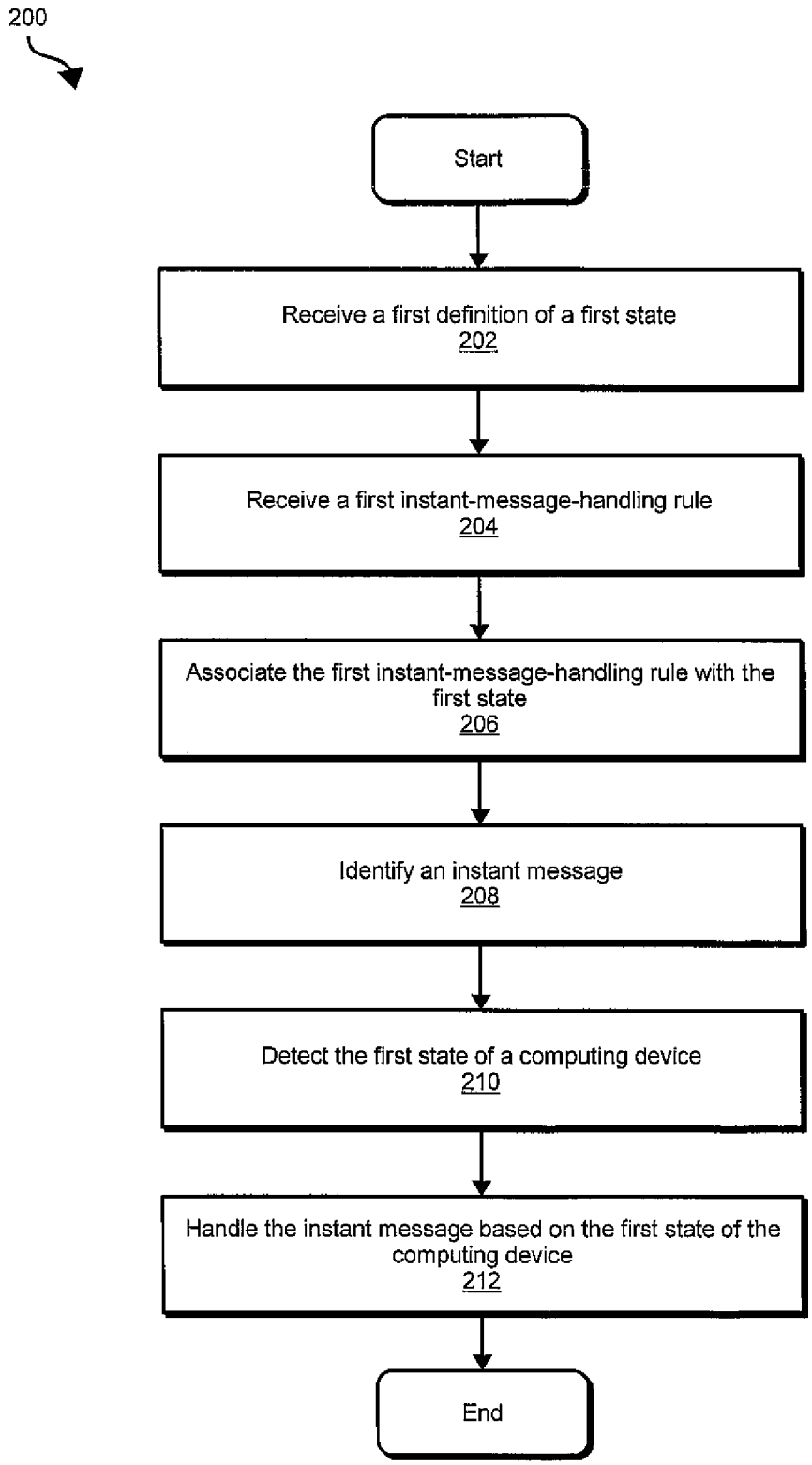
FIG. 2 is a flow diagram of an exemplary computer-implemented method for identifying state conditions and handling instant messages according to certain embodiments.

In some embodiments, a user may select states and message-handling rules from predefined sets of states and/or message-handling rules. In other embodiments, users may define computing-device states and associated message-handling rules for handling instant messages they receive. FIG. 2 is an illustration of an exemplary method 200 for defining a first state and rules for handling messages based on the first state. A state-definition module may receive a first definition of a first state (step 202). In certain embodiments, a state-definition module may be any module capable of receiving definitions and rules for a first state. The state-definition module and the message-handling module may be part of the same application or different applications. According to some embodiments, the first definition may identify a condition of the computing device. Thus, the computing device may be in the first state when the computing device satisfies the condition.

The state-definition module may receive a first instant-message-handling rule (step 204). An instant-message-handling rule may generally be a rule that defines how the instant message is handled. For example, an instant-message-handling rule may tell the message-handling module to hold an instant message as long as the computing device is in a certain state. The instant-message-handling rule may also tell the message-handling module to respond the person who sent the instant message and inform them that the intended recipient may be busy.

In some embodiments, instant messages may be stored (i.e., held) while the computing device is in the first state and then the instant messages may appear automatically when the computing device is no longer in the first state. In at least one embodiment, the instant messages may be stored and available for manual viewing at any time. A user may manually view stored instant messages by using a graphical user interface to retrieve the stored instant messages. For example, a user of the computing device may wish to view stored instant messages while the computing device is still in the first state. The user may be able to manually view instant messages by retrieving a list of all instant messages that have been held while the computing device has been in the first state.

After receiving the definition of the first state, the message-handling module may associate the first instant-message-handling rule with the first state (step 206). Thus, when the computing device is in the first state, the message-handling module may be able to identify the first instant-message-handling rule and apply it to incoming instant messages. The first instant-message-handling rule may be associated with the first state in a database. The first instant-message-handling rule may also be associated with the first state using any other association mechanism.

When an instant message arrives at the first computing device, the message-handling module may identify the instant message (step 208). Typically, the message-handling module may identify the instant message before it is displayed to a user. The message-handling module may detect the first state of the computing device (step 210) and may handle the instant message based on the first state of the computing device (step 212). As previously mentioned, handling an instant message based on a state of a computing device may comprise applying an instant-message-handling rule to the instant message.

In various exemplary embodiments, the instant-message-handling rule may be applied to the instant message when the computing device is in the first state and an additional condition is met. An additional condition may be a condition based on the content of the instant message, a condition based on a time of day, or a condition based on a sender of the instant message. The content of a message may refer to the words used in the instant message. For example, a user may specify that while in presentation mode, any messages containing inappropriate words are blocked. In one embodiment, a database of inappropriate words may be available either on the computing device or on a server, and when the instant message is received while in the first state, the words of the message may be compared to the list of inappropriate words.

Additional conditions for handling instant messages may also comprise the type of content (e.g., sound, picture, video, internet link) contained in the instant messages. For example, a user may specify that while the computing device is in a conference room, any instant messages that contain pictures should be forwarded to the user's email. A user may also specify that while the computing device is in the conference room, the volume should be muted for any instant messages that contain sound.

In another example, an instant message may be sent to a message-handling module on a computing device. The computing device may belong to a user Bob. Bob may define the first condition as the location of a conference room and may create a rule that holds all messages until he is no longer in the conference room. When Bob carries the computing device into the conference room, the message-handling module may detect that the computing device is in the conference room. In some embodiments, the message-handling module may detect the state of Bob's computer when an instant message arrives. In other embodiments, the message-handling module may check the state of the computing device periodically. The message-handling module may hold the instant message until Bob leaves the conference room.

Multiple instant-message-handling rules may be associated with a single state. For example, Bob may want to hold all messages while in a meeting unless the sender is on a predefined list of emergency contacts. If Bob's wife Carol is on the list of emergency contacts, a message from Carol may display even when Bob is in his meeting and other messages are held.

In various embodiments, handling the instant message based on the first state of the computing device may comprise storing state definitions and instant-message-handling rules in a database. The database may associate state definitions with instant-message-handling rules. Examples of instant-message-handling rules may include rules for allowing the instant message to display, holding the instant message, sending an automatic reply to the sender of the instant message, ignoring the instant message, forwarding the instant message to another device, displaying a new instant message indicator with no audio notification, displaying a new instant message indicator without displaying message content, or any other rule defining how to handle an instant message.

FIG. 3 is a block diagram of an exemplary database 300. Database 300 may comprise a set of state definitions 310 and a set of rules 320. The set of state definitions 310 may comprise state definitions 312, 314, 316, and 318. The set of rules 320 may comprise rules 322, 324, 326, and 328, which may be instant-message-handling rules. State definition 312 may be associated with rule 322, state definition 314 may be associated with rule 324, state definition 316 may be associated with rules 324 and 326, and state definition 318 may be associated with rule 328.

State definitions 312, 314, 316, and 318 may describe computing device conditions, and rules 322, 324, 326, and 328 may define how a message-handling module will handle an instant message if the computing device satisfies the conditions. For example, rule 322 may direct the message-handling module to hold the instant message for future retrieval if the computing device is in the state defined by state definition 312. Rule 324 may direct the message-handling module to display a new message indicator with no audio output, rule 326 may direct the message-handling module to send an automatic reply to the sender with the text "In meeting until 4:30," and rule 328 may direct the message-handling module to allow the instant message to appear or display as normal.

State definition 312 may define that the computing device is in a first state when a presentation application is running on the computing device. State definition 314 may define that the computing device is in a second state when the computing device is in a conference room. State definition 316 may define that the computing device is in a third state when a calendaring program indicates that the user of the computing device is in a meeting. State definition 318 may define that the computing device is in a fourth state when the computing device is connected to a home network.

According to the rules and state definitions in the previous example, when the computing device is in a conference room, the message-handling module may display a new message indicator with no audio output when an instant message arrives. When the user of the computing device is in a meeting, the message-handling module may display a new message indicator with no audio output and send an automatic reply to the sender with the text "In meeting until 4:30" when an instant message arrives. When the computing device is connected to a home network, the message-handling module may allow the instant message to appear or display as normal.

Figure 4:
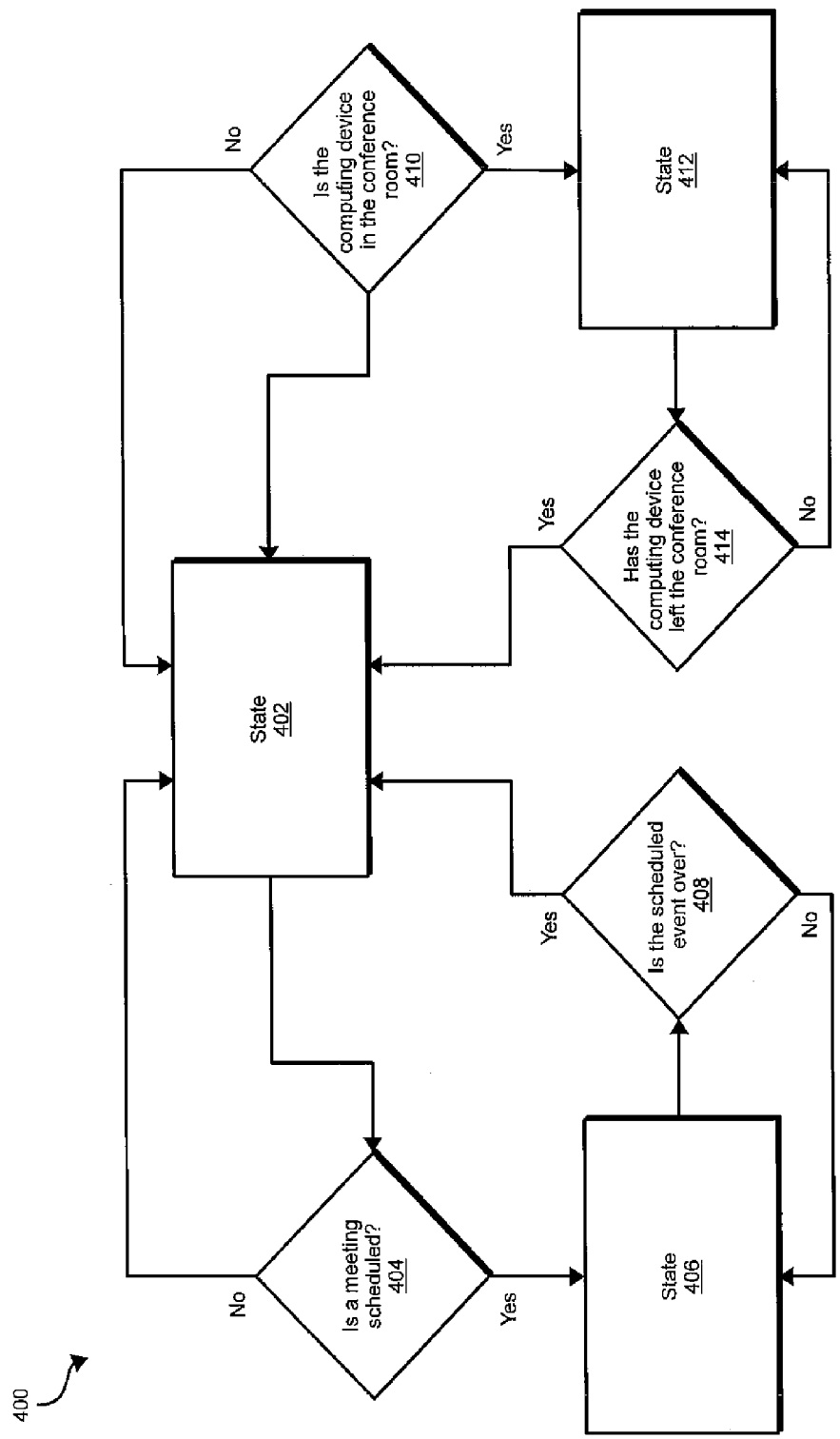
FIG. 4 is a state diagram for detecting the state of a computing device according to some embodiments.

FIG. 4 is a flow diagram 400 for determining the state of a computing device. FIG. 4 shows a first state 402, a second state 406, and a third state 412. A computing device may be in state 402 when the computing device is not in a conference room and when a user of the computing device does not have any meetings scheduled in a calendaring program. The computing device may enter state 406 when it is time for a scheduled meeting to begin. The computing device may enter state 412 when the computing device enters the conference room.

A message-handling module may determine whether or not a meeting is scheduled (decision point 404). If a meeting is scheduled, the message-handling module may determine that the computing device is in state 406. While the computing device is in state 406, the message-handling module may use rules associated with state 406 to determine how to handle incoming instant messages. The message-handling module may determine whether or not the scheduled event is over (decision point 408). If the scheduled event is over, the computing device may return to state 402. If the scheduled event is not over, the computing device may remain in state 406.

At decision point 410, the message-handling module may determine if the computing device is in a conference room. If the computing device is in a conference room, the computing device may be in state 412. If the computing device has not entered the conference room, the computing device may remain in state 402. Once the computing device is in state 412, the message-handling module may determine whether or not the computing device has left the conference room (decision point 414). If the computing device has left the conference room, the computing device may return to state 402. If the computing device remains in the conference room, the computing device may remain in state 412.

In certain embodiments, the steps illustrated in FIG. 4 may be performed by a plug-in installed in an instant messaging client. For example, state-specific plug-ins may detect the state of a computing device. A state-specific plug-in may be a plug-in configured to detect at least one condition of a computing device. For example, a computing device may contain three state-specific plug-ins. The first plug-in may be configured to detect presentation applications running on the computing device, the second plug-in may be configured to detect screen-sharing applications running on the computing device, and the third plug-in may be configured to detect the location of the computing device. In other embodiments, detecting the state of the computing device may be performed by the instant messaging client without any plug-ins.

The state of a computing device may be checked by a message-handling module immediately after an instant message arrives at an instant messaging client. In some embodiments, a message-handling module may detect the state of a computing device periodically. For example, a message-handling module may check the state of a computing device at fixed intervals. The message-handling module may check the state every thirty seconds and therefore may quickly detect when the computing device enters into a conference room. The message-handling module may continue checking the state of the computing device every thirty seconds and detect when the computing device leaves the conference room. The message-handling module may also check the state of the computing device at any other interval of time. In various embodiments, the state may be checked both periodically and upon the arrival of an instant message (i.e., asynchronously).

Figure 5:
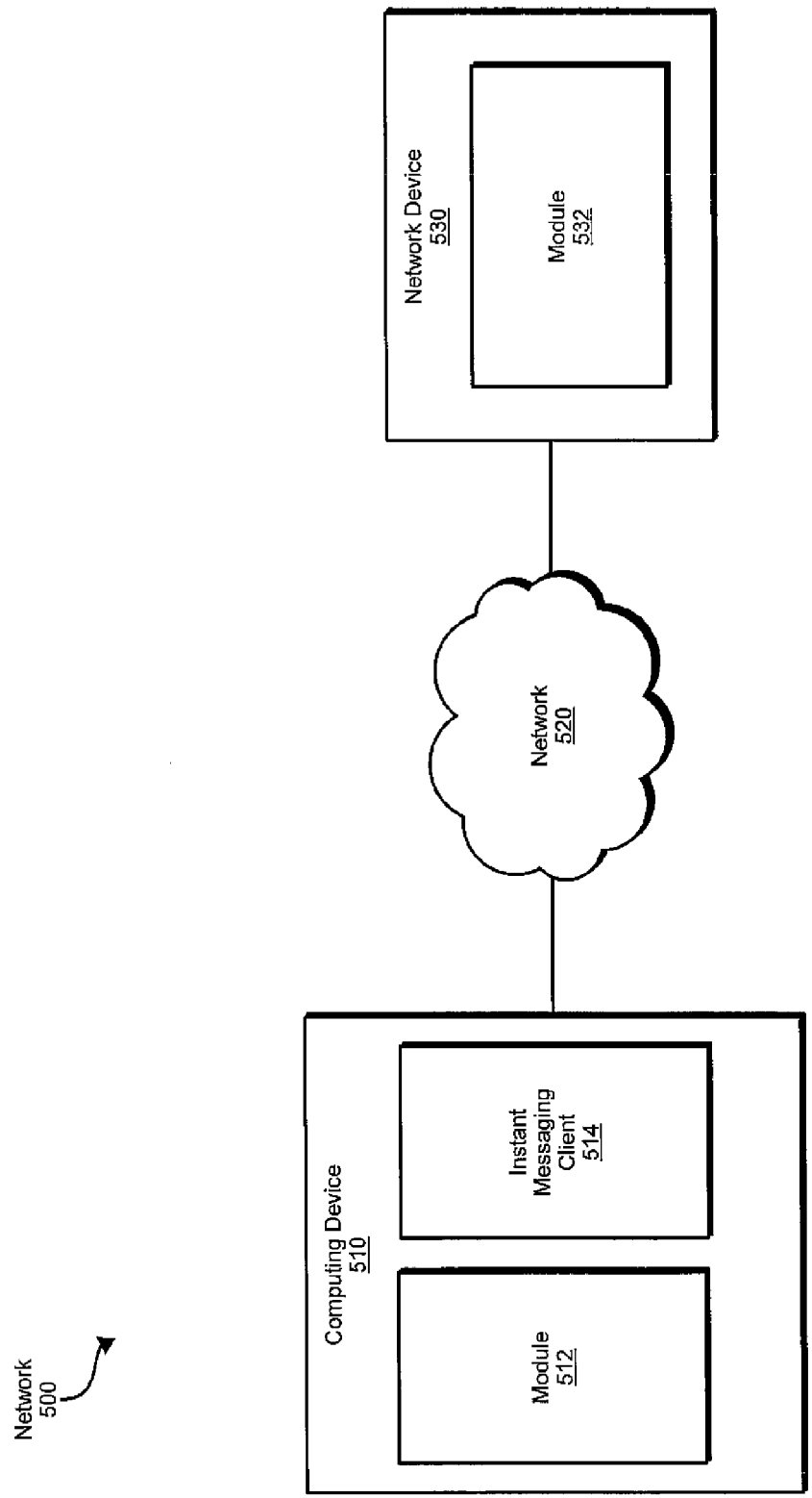
FIG. 5 is a block diagram of an exemplary network capable of implementing one or more of the methods described in the instant disclosure according to at least one embodiment.

Detecting a first state of a computing device and handling an instant message may be performed by a module on the computing device. In other embodiments, detecting the state of the computing device and handling an instant message may be performed by a module on a network device. FIG. 5 is a block diagram of a network 500 for detecting states and handling instant messages. Network 500 may comprise a computing device 510, a network 520, and a network device 530. Computing device 510 may comprise a module 512 and an instant messaging client 514. Network device 530 may comprise a module 532. In at least one embodiment, network device 530 may be an instant messaging server capable of routing or sending an instant message to computing device 510 via network 520.

In some embodiments, network device 530 may be a network gateway capable of routing, sending, or handling instant messages. Module 532 may be any module capable of detecting the state of computing device 510. Module 532 may also be capable of handling instant messages based on a first state of computing device 510. For example, module 532 may detect that computing device 510 is running a screen-sharing application. Module 532 may then send automatic replies to all messages intended for computing device 510 while computing device 510 is running the screen-sharing application.

In at least one embodiment, detecting a first state of a first computing device may comprise determining a type of the first computing device. For example, computing device 510 may be a laptop computer belonging to Susan. Susan may use both her laptop (computing device 510) and a desktop computer (not shown) to receive instant messages. Susan may not want new instant messages to display on her laptop, but not on her desktop, when she is in meetings. Module 532 may determine whether the instant message is being sent to Suzan's laptop or desktop when Susan has a meeting scheduled. Module 532 may prevent instant messages from displaying on Susan's laptop during meetings, but may allow instant messages to display on her desktop during meetings. Thus, whether an instant message is displayed may be based on the type of device to which the message is being sent.

According to at least one embodiment, identifying an instant message, handling an instant message, and detecting a first state of computing device 510 may all be performed by a message-handling module on computing device 510. For example, module 512 may be a plug-in instant messaging client 514. Instant messaging client 514 may receive an instant message. Module 512 may then handle the instant message based on the state of computing device 510. In various embodiments, one or more of the steps of identifying an instant message, handling an instant message, and detecting the first state of computing device 510 may be performed on a combination of network device 530 and computing device 510.

Figure 6:
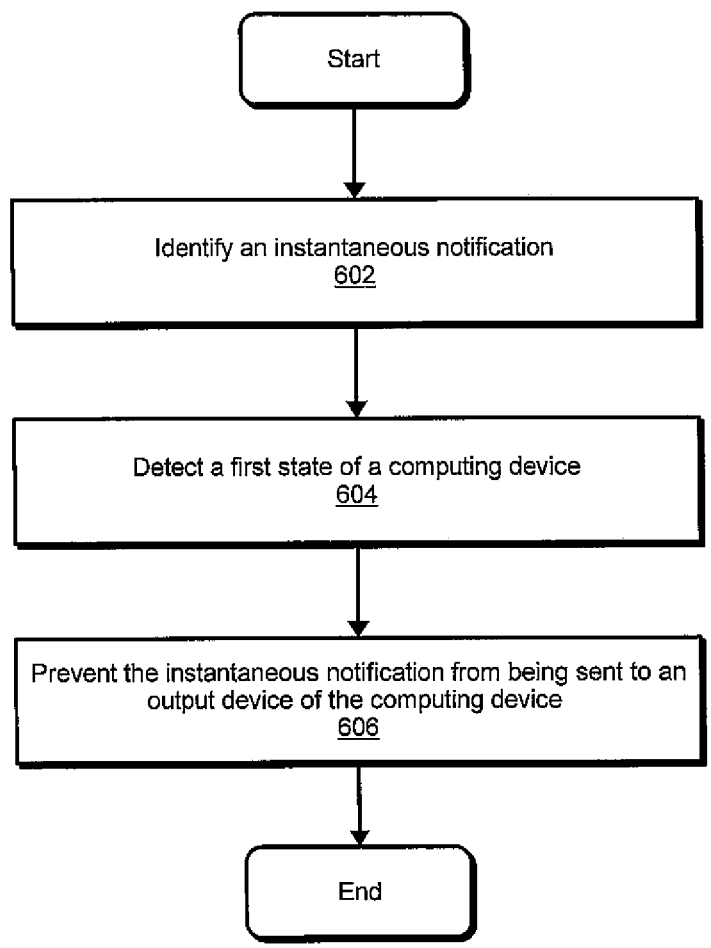
FIG. 6 is a flow diagram of an exemplary computer-implemented method for preventing instantaneous notifications from being sent to an output device according to certain embodiments.

As with instant messages, instantaneous notifications may arrive at inopportune times. For example, a loud beeping noise may occur when a high priority email arrives, and a user may not want to have the beeping noise go off when the user is giving a presentation. FIG. 6 illustrates an exemplary method 600 for determining when to prevent instantaneous notifications from being sent to an output device. A notification-handling module may identify an instantaneous notification (step 602). The notification-handling module may be any module capable of identifying and/or handling instantaneous notifications.

In various embodiments, an instantaneous notification may be a notification to update software, an new email pop-up notification, a network connectivity notification, a task-bar pop-up notification, an audio email notification (e.g., an audio notification that a new email has arrived), or any other suitable instantaneous notification. For example, an instantaneous notification may tell a user to update an antivirus program or inform the user that a new email has arrived. An instantaneous notification may alert the user that a network connection has been lost or that a new network connection has been made. Other instantaneous notifications may be firewall notifications. For example, an instantaneous notification from a firewall program may alert the user about specific programs attempting to access the internet.

The notification-handling module may detect the state of the computing device (step 604). As discussed in FIG. 2, detecting the state of the computing device may include detecting that the computing device satisfies a first condition. The notification-handling module may prevent the instantaneous notification from being sent to an output device of the computing device (step 606). In certain embodiments, in addition to preventing the instantaneous notification from being sent to an output device, the notification-handling module may store the notification for future retrieval or output. For example, notifications may be stored in a notification database while the computing device is in the first state and then the notifications may appear automatically when the computing device is no longer in the first state.

In some embodiments, the notifications may be stored and available for manual viewing at any time. As with stored or held instant messages, a user may manually view stored notifications by using a graphical user interface to retrieve the stored notifications. For example, a user of the computing device may wish to view stored notifications while the computing device is in the first state. The user may be able to manually view notifications by retrieving a list of all notifications and a description of when and why the notifications occurred. In some embodiments, the notifications may be stored in a database (or any other suitable storage mechanism) for future retrieval.

In various exemplary embodiments, the output device may be a display device. For example, the notification-handling module may prevent an instantaneous notification from being sent to a monitor, a projector, or any other display device. In at least one embodiment, the output device may comprise an audio device. For example, the notification-handling module may prevent an instantaneous notification from being sent to computer speakers, a PA system, or any other audio device.

Figure 7:
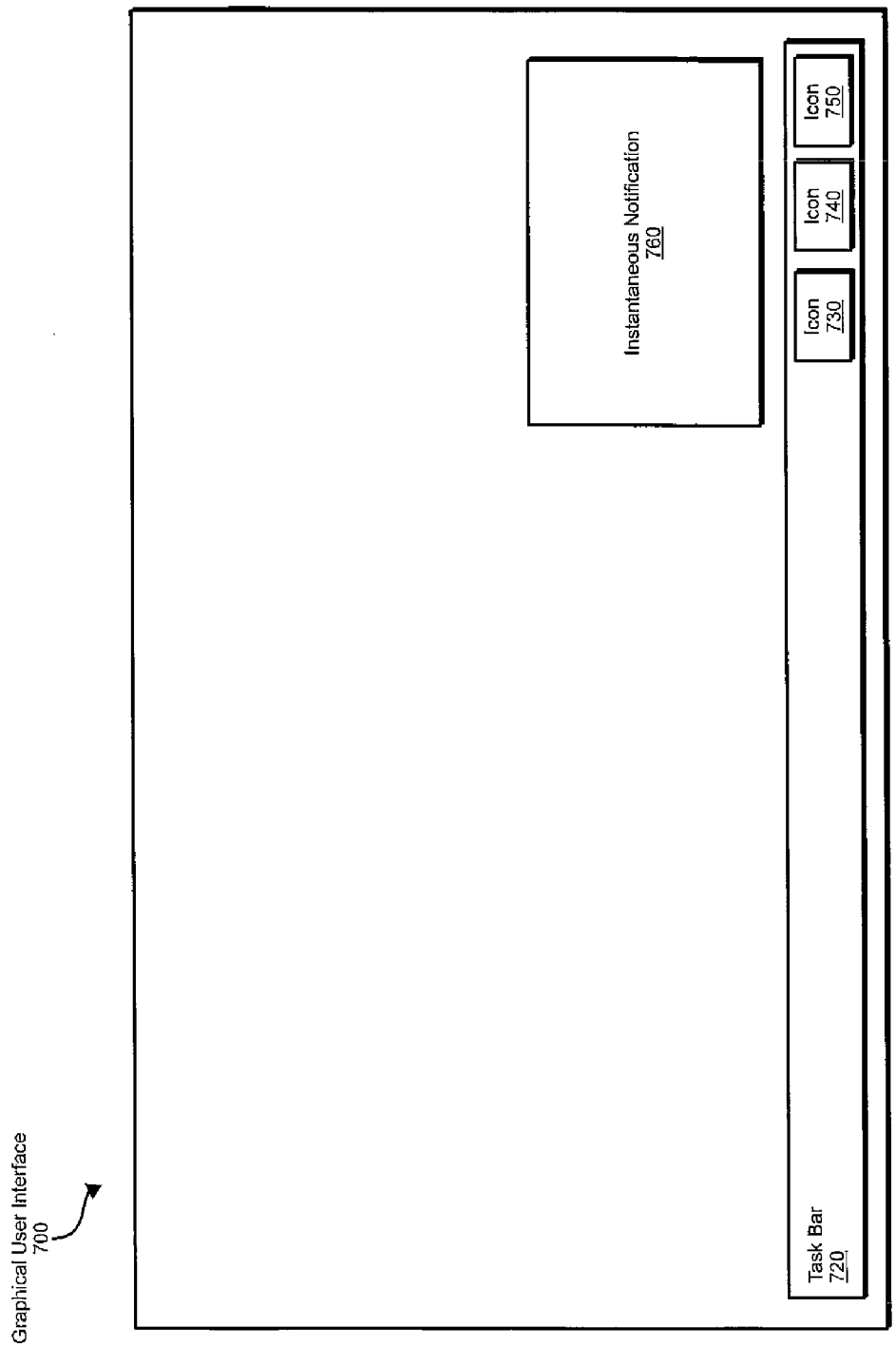
FIG. 7 is a block diagram of an exemplary graphical user interface according to certain embodiments.

In some embodiments, instantaneous notifications may be task-bar pop-ups. FIG. 7 illustrates a graphical user interface 700 capable of displaying instantaneous notifications related to task-bar icons. Graphical user interface 700 may include a task-bar 720 and an instantaneous notification 760. Task-bar 720 may include icons 730, 740, and 750. Graphical user interface 710 may be an operating system interface or any other suitable interface. Task-bar 720 may be any task-bar for an operating system or any other suitable task-bar. Icons 730, 740, and 750 may be program icons.

In various embodiments, notification 760 may be related to at least one of the icons on task-bar 720. In some embodiments, instantaneous notification 760 may be a pop-up from an icon on task-bar 720. For example, icon 730 may be an antivirus software icon, icon 740 may be an instant messaging client icon, and icon 750 may be a volume icon. Instant notification 760 may be a pop-up from icon 730 and may be a notification to update the antivirus program. In at least one embodiment, instantaneous notifications may be notifications that generally occur in the lower right of an operating system's graphical user interface.

Figure 8:
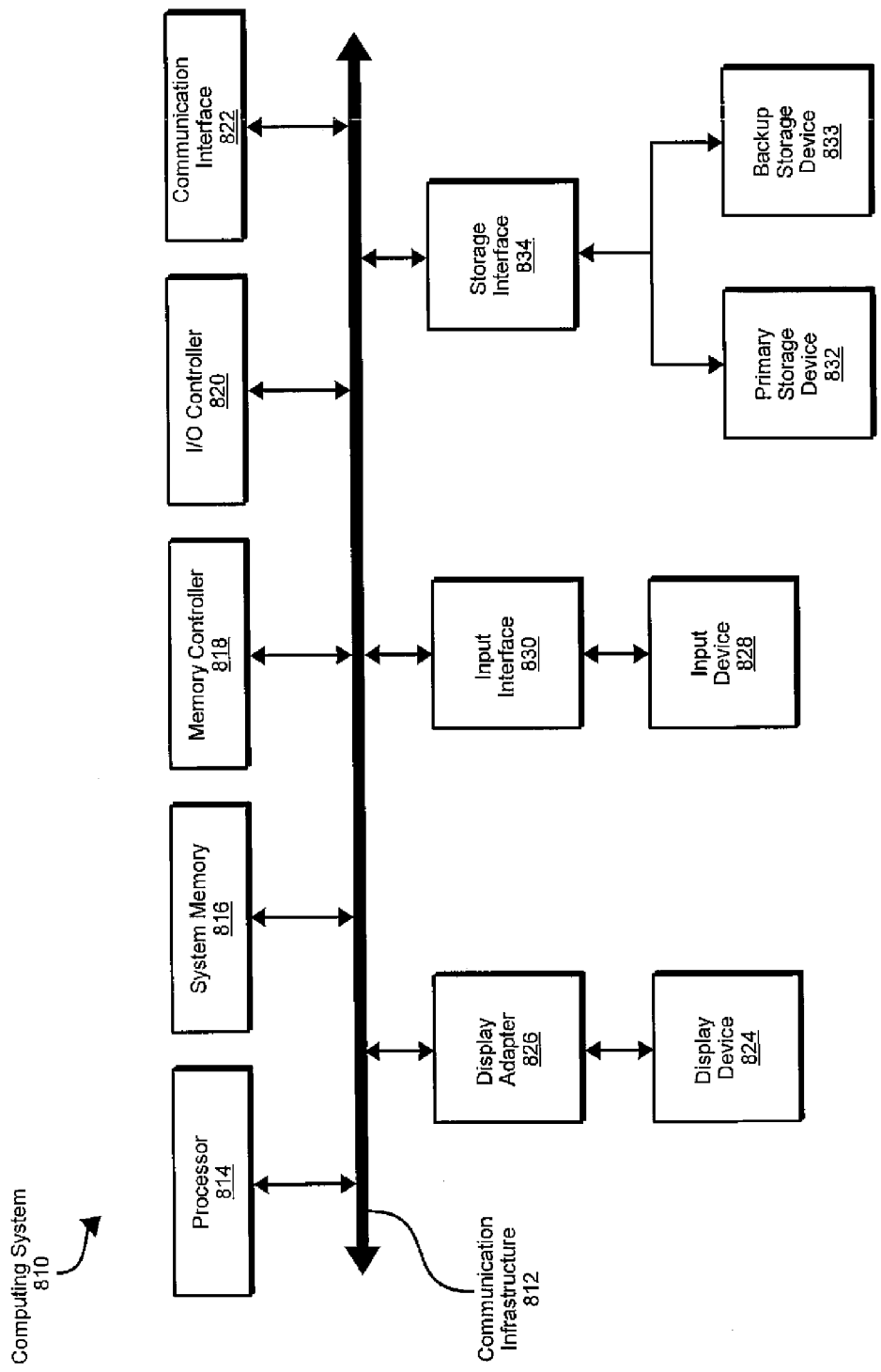
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, detecting, handling, receiving, associating, providing, holding, allowing, sending, ignoring, forwarding, displaying, checking, and preventing steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, detecting, handling, receiving, associating, providing, holding, allowing, sending, ignoring, forwarding, displaying, checking, and preventing.

I/O controller 820 generally represents any type or form of module capable of coordinating and/or controlling the input and output functions of a computing device. For example, in certain embodiments I/O controller may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the identifying, detecting, handling, receiving, associating, providing, holding, allowing, sending, ignoring, forwarding, displaying, checking, and preventing steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, detecting, handling, receiving, associating, providing, holding, allowing, sending, ignoring, forwarding, displaying, checking, and preventing steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, detecting, handling, receiving, associating, providing, holding, allowing, sending, ignoring, forwarding, displaying, checking, and preventing steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, the exemplary file systems disclosed herein may be stored on primary storage device 832, while the exemplary file-system backups disclosed herein may be stored on backup storage device 833. Storage devices 832 and 833 may also be used, for example, to perform and/or be a means for performing, either alone or in combination with other elements, one or more of the identifying, detecting, handling, receiving, associating, providing, holding, allowing, sending, ignoring, forwarding, displaying, checking, and preventing steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
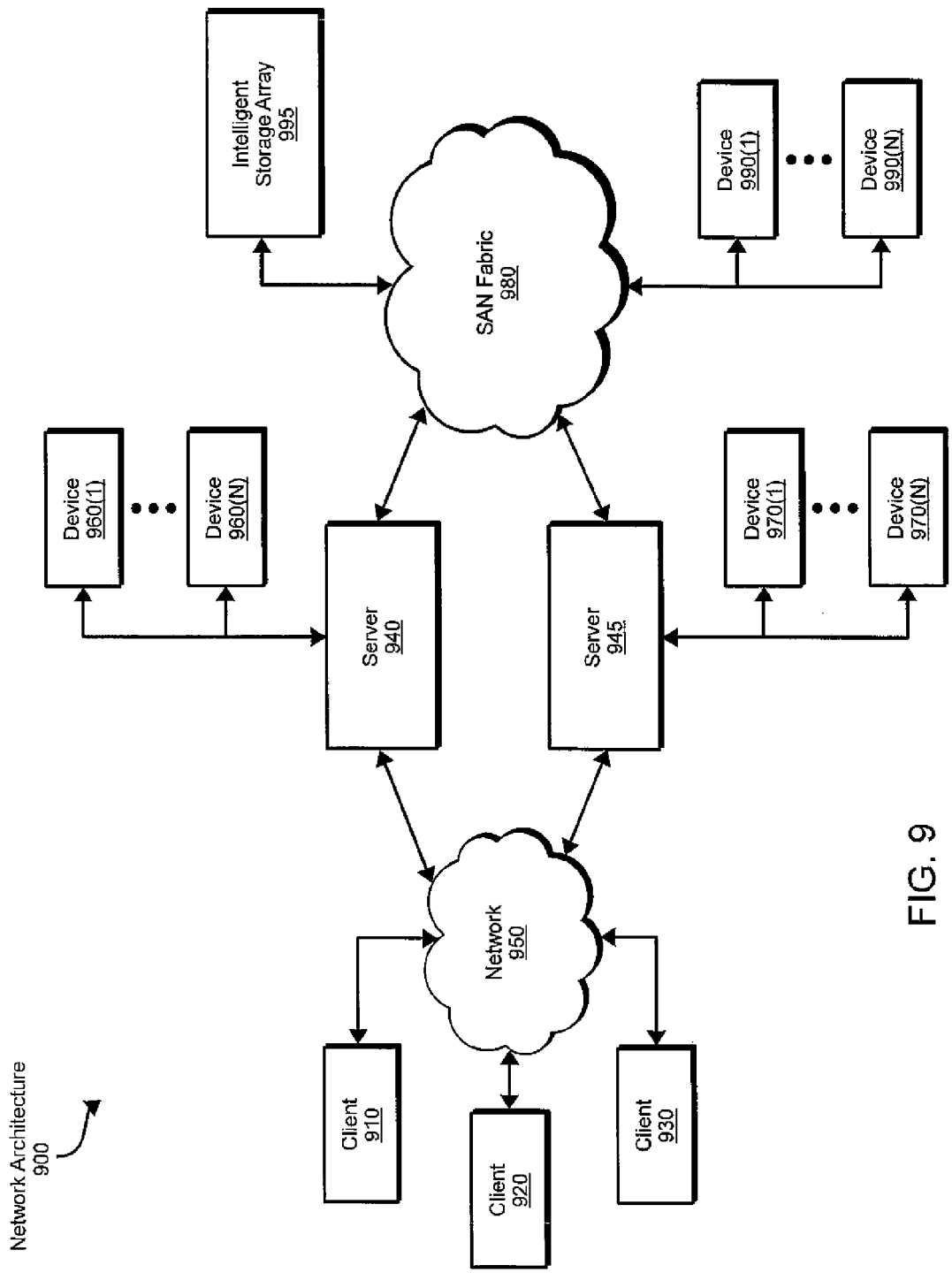
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or to run certain software applications. Network 950 generally represents any telecommunication or computer network; including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 990(1)-(N) may be directly attached to server 945. Storage devices 960(1)-(N) and storage devices 990(1)-(N) generally represent any type or form of storage device or medium capable of storing data and/or other computer-readable instructions. In certain embodiments, storage devices 960(1)-(N) and storage devices 990(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and intelligent storage array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, detecting, handling, receiving, associating, providing, holding, allowing, sending, ignoring, forwarding, displaying, checking, and preventing steps disclosed herein. Network architecture 900 may also be used to perform and/or be a means for performing other steps and features set forth in the instant disclosure.

As detailed above, computing system 810 and/or one or more of the components of network architecture 900 may perform and/or be a means for performing, either alone or in combination with other elements, one or more steps of the exemplary methods described and/or illustrated herein. In at least one embodiment, this exemplary computer-implemented method may comprise identifying an instant message, detecting a first state of a computing device, and handling the instant message based on the first state of the computing device. In various embodiments, detecting the first state of the computing device may comprise detecting that the computing device satisfies a first condition. The first condition may be a first location of the computing device, a first application running on the computing device, a first condition of the first application, or a scheduled event. In at least one embodiment the first application may be a presentation application or a screen-sharing application. In various embodiments, detecting that the computing device satisfies the first condition comprises identifying scheduling information from a calendar program.

The method may further comprise receiving a first definition of the first state, receiving a first instant-message-handling rule, and associating the first instant-message-handling rule with the first state. The first definition may identify a first condition of the computing device and detecting the first state may comprise detecting that the computing device satisfies the first condition according to some embodiments. In certain embodiments, handling the instant message based on the first state may comprise applying the first instant-message-handling rule to the instant message.

In various embodiments the method may also comprise providing a graphical user interface. The graphical user interface may receive the first definition of the first state and the first instant-message-handling rule. According to at least one embodiment, the first instant-message-handling rule may be applied to the instant message when the computer is in the first state and an additional condition is met. The additional condition may comprise a time of day, a sender of the instant message, or content of the instant message. In some embodiments, handling the instant message may comprise allowing the instant message to display, holding the message, sending an automatic reply to the sender of the message, ignoring the message, forwarding the message to another device, displaying a new message indicator with while suppressing audio notification, or displaying a new message indicator without displaying message content.

In certain embodiments, identifying the instant message, detecting the state of the computing device, and handling the instant message may be performed by a software module installed on the computing device. In various embodiments, detecting the first state may be performed by a plug-in for an instant messaging client or an instant messaging client itself. In some embodiments, detecting the first state may comprise periodically determining the state of the computing device, checking the state of the computing device upon arrival of the instant message, or identifying scheduling information from a calendar program.

Computing system 810 and/or one or more of the components of network architecture 900 may contain a computer-readable medium comprising a first computer-executable instruction operable to identify an instant message, a second computer-executable instruction operable to detect a first state of a computing device, and a third computer-executable instruction operable to handle the instant message based on the first state of the computing device. The computer-readable medium may also comprise a fourth computer-executable instruction operable to receive a definition of the first state, a fifth computer-executable instruction operable to receive a first instant-message-handling rule, and a sixth computer-executable instruction operable to associate the first instant-message-handling rule with the first state.

In some embodiments, the second computer-executable instruction may be operable to identify scheduling information from a calendar program. In at least one embodiment, the second computer-executable instruction may comprise a plug-in operable to periodically determine a condition of the computing device, check the state of the computing device upon arrival of the instant message, identify scheduling information from a calendar program, or determine a type of the computing device.

In various embodiments, a computer-implemented method may comprise identifying an instantaneous notification, detecting a first state of a computing device, and preventing the instantaneous notification from being sent to an output device of the computing device when the computing device is in the first state. According to at least one embodiment, the output device may be a display device or an audio device. In some embodiments, detecting the first state of the computing device may comprise detecting that the computing device satisfies a first condition. The first condition may comprise a first location of the computing device, a first application running on the computing device, a first condition of the first application, or a scheduled event. In various embodiments, preventing the instantaneous notification from being sent to the output device may comprise storing the instantaneous notification for future retrieval. In at least one embodiment, the instantaneous notification may comprise a software update notification, an email notification, a network connectivity notification, a task-bar pop-up notification, or an audio email notification (e.g., an audio notification that a new email has arrived).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

I claim:

1. A computer-implemented method for handling instant messages, at least a portion of the computer-implemented method being performed by a computing system comprising at least one processor, the computer-implemented method comprising:
   identifying an instant message sent to a user;
   detecting a first state of a computing device, the first state being that the computing device is in a conference room;
   receiving a first instant-message-handling rule;
   associating the first instant-message-handling rule with the first state;
   handling the instant message by applying the first instant-message-handling rule to the instant message, wherein:
      the first instant-message-handling rule is applied to the instant message when the computing device is in the first state and an additional condition is met;
      handling the instant message according to the first instant-message-handling rule comprises:
      checking whether the instant message contains a picture, determining that the instant message contains a picture, and
      selectively forwarding the instant message to an email address of the user based on the checking whether the instant message contains a picture;
   wherein the forwarding is selective such that the instant message is forwarded to the email address if the instant message is determined to contain a picture and the instant message is not forwarded to the email address if the instant message is determined to not contain a picture.

2. The computer-implemented method of claim 1, wherein the first instant-message-handling rule and the first state are associated in a database.

3. The computer-implemented method of claim 1, further comprising, in response to the computing device being in the first state and applying the first instant-message-handling rule to the instant message, automatically replying to a sender of the instant message with a predefined response that is associated with the first state.

4. The computer-implemented method of claim 1, further comprising:
   installing a first state-specific plug-in to an instant messaging client that displays the instant message, wherein the first state-specific plug-in to the instant messaging client detects the first state of the computing device;
   installing a second state-specific plug-in to the instant messaging client, the second state-specific plug-in being programmed to detect a second state of the computing device.

5. The computer-implemented method of claim 1, further comprising:
   receiving a first definition of the first state, wherein:
      the first definition identifies a first computing device condition;
      detecting the first state comprises detecting that the computing device satisfies the first condition.

6. The computer-implemented method of claim 5, further comprising:
   providing a graphical user interface, wherein:
      the graphical user interface receives the first definition of the first state;
      the graphical user interface receives the first instant-message-handling rule.

7. The computer-implemented method of claim 1 wherein the additional condition comprises at least one of:
   a time of day;
   a sender of the instant message;
   content of the instant message.

8. The computer-implemented method of claim 1, wherein the first instant-message-handling rule specifies that, while the computing device is in the conference room, the volume will be muted for any instant message that contains sound.

9. The computer-implemented method of claim 1, wherein identifying the instant message, detecting the first state of the computing device, and handling the instant message are performed by a software module installed on the computing device.

10. The computer-implemented method of claim 1, further comprising detecting a second state of the computing device.

11. The computer-implemented method of claim 1, further comprising detecting a second state of the computing device by distinguishing between whether the computing device is a laptop or a desktop.

12. A non-transitory computer-readable medium comprising one or more computer-executable instructions that, when executed by a computing system, cause the computing system to:
   identify an instant message sent to a user;
   detect a first state of a computing device, the first state being that the computing device is in a conference room;
   receive a first instant-message-handling rule;
   associate the first instant-message-handling rule with the first state;
   handle the instant message by applying the first instant-message-handling rule to the instant message, wherein:
      the first instant-message-handling rule is applied to the instant message when the computing device is in the first state and an additional condition is met;
   handling the instant message according to the first instant-message-handling rule comprises:
      checking whether the instant message contains a picture, determining that the instant message contains a picture, and
      selectively forwarding the instant message to an email address of the user based on the checking whether the instant message contains a picture;
   wherein the forwarding is selective such that the instant message is forwarded to the email address if the instant message is determined to contain a picture and the instant message is not forwarded to the email address if the instant message is determined to not contain a picture.

13. The non-transitory computer-readable medium of claim 12, further comprising one or more computer-executable instructions that, when executed by the computing system, cause the computing system to:
   receive a definition of the first state.

14. The non-transitory computer-readable medium of claim 12, further comprising one or more computer-executable instructions that, when executed by the computing system, cause the computing system to identify scheduling information from a calendar program.

15. The non-transitory computer-readable medium of claim 12, further comprising one or more computer-executable instructions that, when executed by the computing system, cause the computing system to:

in response to the computing device being in the first state and applying the first instant-message-handling rule to the instant message, automatically reply to a sender of the instant message with a predefined response that is associated with the first state.

16. A system for handling instant messages, the system comprising a message-handling module programmed to:
   identify an instant message sent to a user;
   detect a first state of a computing device, the first state being that the computing device is in a conference room;
   receive a first instant-message-handling rule;
   associate the first instant-message-handling rule with the first state;
   handle the instant message by applying the first instant-message-handling rule to the instant message, wherein:
      the first instant-message-handling rule is applied to the instant message when the computing device is in the first state and an additional condition is met;
      handling the instant message according to the first instant-message-handling rule comprises:
      checking whether the instant message contains a picture,
      determining that the instant message contains a picture, and
      selectively forwarding the instant message to an email address of the user based on the checking whether the instant message contains a picture;
   wherein the forwarding is selective such that the instant message is forwarded to the email address if the instant message is determined to contain a picture and the instant message is not forwarded to the email address if the instant message is determined to not contain a picture.

17. The system of claim 16, wherein the message-handling module is further programmed to:
   install a first state-specific plug-in to an instant messaging client that displays the instant message, wherein the first state-specific plug-in to the instant messaging client detects the first state of the computing device;
   install a second state-specific plug-in to the instant messaging client, the second state-specific plug-in being programmed to detect a second state of the computing device.

18. The system of claim 16, wherein the message-handling module is further programmed to, in response to the computing device being in the first state and applying the first instant-message-handling rule to the instant message, automatically reply to a sender of the instant message with a predefined response that is associated with the first state.

19. The system of claim 16, wherein the message-handling module is further programmed to:
   provide a graphical user interface, wherein:
      the graphical user interface receives a first definition of the first state;
      the graphical user interface receives the first instant-message-handling rule.

20. The system of claim 16, wherein the additional condition comprises at least one of:
   a time of day;
   a sender of the instant message;
   content of the instant message.

* * * * *